United States Patent
Gentilin et al.

(10) Patent No.: US 9,761,056 B1
(45) Date of Patent: Sep. 12, 2017

(54) TRANSITIONING FROM A VIRTUAL REALITY APPLICATION TO AN APPLICATION INSTALL

(71) Applicant: Immersv, Inc., Palo Alto, CA (US)

(72) Inventors: John Charles Gentilin, Castro Valley, CA (US); Mihir Shah, Palo Alto, CA (US); Andrew Raymond Buck, Sunnyvale, CA (US); Jonathan Linsner, San Leandro, CA (US)

(73) Assignee: Immersv, Inc., Emeryville, CA (US)

( * ) Notice: Subject to any disclaimer, the term of this patent is extended or adjusted under 35 U.S.C. 154(b) by 0 days.

(21) Appl. No.: 15/066,858

(22) Filed: Mar. 10, 2016

(51) Int. Cl.
G06T 19/00 (2011.01)
H04L 29/06 (2006.01)
H04L 29/08 (2006.01)
A63F 13/26 (2014.01)

(52) U.S. Cl.
CPC ............ *G06T 19/006* (2013.01); *A63F 13/26* (2014.09); *H04L 67/34* (2013.01); *H04L 67/38* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2013/0050199 A1* | 2/2013 | Chavez | ............... | G06Q 10/101 345/419 |
| 2013/0201215 A1* | 8/2013 | Martellaro | ............... | G09G 5/00 345/633 |
| 2013/0263016 A1 | 10/2013 | Lehtiniemi | | |
| 2015/0058102 A1* | 2/2015 | Christensen | ............ | G11B 27/11 705/14.6 |
| 2015/0202962 A1* | 7/2015 | Habashima | ............ | B60K 35/00 345/633 |
| 2015/0243078 A1 | 8/2015 | Watson | | |
| 2015/0309316 A1* | 10/2015 | Osterhout | ............... | G06F 1/163 345/8 |

(Continued)

OTHER PUBLICATIONS

TouchstoneVR ("The State of Advertising in the World of Virtual Reality [VR]", Feb. 5, 2016, https://touchstoneresearch.com/the-state-of-advertising-in-the-world-of-virtual-reality-vr/).*

(Continued)

*Primary Examiner* — Kee M Tung
*Assistant Examiner* — Xin Sheng
(74) *Attorney, Agent, or Firm* — Elliot H. Karlin; Hickman Palermo Becker Bingham LLP

(57) ABSTRACT

A method and apparatus for transitioning from a virtual reality environment to an application download environment is provided. In an embodiment, a digital graphical virtual reality application executes on a client computing device. A request is received to download additional content at a future time. The client computing device makes a determination that the digital graphical virtual reality application has been terminated. In response to determining that the application has been terminated, the client computing device displays a notification for downloading additional content. Upon receiving a selection of the notification, the client computing device sends a request to a marketplace application to cause the client computing device to download the additional content.

16 Claims, 7 Drawing Sheets

(56) References Cited

U.S. PATENT DOCUMENTS

| | | | | |
|---|---|---|---|---|
| 2015/0350292 | A1* | 12/2015 | Maman | H04L 67/02 709/219 |
| 2016/0133201 | A1* | 5/2016 | Border | G06T 5/00 345/694 |
| 2016/0161747 | A1* | 6/2016 | Osterhout | G02B 27/0176 345/8 |
| 2016/0187974 | A1* | 6/2016 | Mallinson | G06F 3/014 463/32 |

OTHER PUBLICATIONS

StackOverFlow ("How to wait for a process to terminate to execute another process in batch file", 2015, http://stackoverflow.com/questions/8177695/how-to-wait-for-a-process-to-terminate-to-execute-another-process-in-batch-file).*

U.S. Appl. No. 15/000,381, filed Jan. 19, 2016, Office Action, May 31, 2016.

U.S. Appl. No. 15/000,381, filed Jan. 19, 2016, Interview Summary, Dec. 5, 2016.

U.S. Appl. No. 15/000,381, filed Jan. 19, 2016, Interview Summary, Jul. 19, 2016.

U.S. Appl. No. 15/000,381, filed Jan. 19, 2016, Final Office Action, Sep. 16, 2016.

Gentilin, U.S. Appl. No. 15/000,381, filed Jan. 19, 2016, Office Action, dated Apr. 19, 2017.

Bierbaum et al. "VR Juggler: A Virtual Platform for Vityual Reality Application Development", In Proceedings of the Virtual Reality, 2001 Conference, IEEE, 6 pages.

* cited by examiner

TRANSITIONING FROM A VIRTUAL REALITY APPLICATION TO AN APPLICATION INSTALL

FIELD OF THE DISCLOSURE

The present disclosure generally relates to the field of computer-based virtual reality systems and applications. Specifically, the present disclosure relates to digitally programmed logic for creating virtual reality environments for displaying content using head-mounted displays and other digital display devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based virtual reality devices provide a unique immersive experience for a user. Through virtual reality applications, a user is capable of experiencing a fully modeled three dimensional world of a game or movie as if the user was actually in the game or movie. Virtual reality computer systems typically comprise a programmed digital computer coupled, directly or indirectly via networks, to a display device that is capable of rendering a virtual 3D world or environment on a two-dimensional display panel. In some cases the display device may be a head mounted display (HMD) consisting of a wearable apparatus having one or more displays that can be positioned close to the eyes of the user.

HMDs provide an immersive virtual reality experience for a user. Immersion in the visual experience is achieved in part because the HMD displays video across the entire frontal and peripheral visual field of the user so that the real external environment is not seen. An HMD creates the immersive feel by allowing an application publisher to provide a hands free immersion into video games or 3D filmed content. By tracking the movement of the headset in three dimensions through one or more motion detecting chips, an HMD is capable of displaying the 3D environment in a manner that synchronizes with the motion of a person's head. Thus, as a person turns or rotates their head, the headset is capable of recognizing the motion and displaying to the user a corresponding portion of the virtual reality environment.

As virtual reality applications become more available to the public, it becomes more important to be able to display outside content within a particular virtual reality application. "Outside content," in this context, means content from third parties with respect to the user and the virtual reality application provider. For example, many modern HMDs, such as the Samsung Gear VR™ and the Google Cardboard™, make use of the technology in modern smartphones to provide virtual reality applications, thereby opening up virtual reality headsets to a wider audience and allowing application developers to reach a wider audience. As with other types of mobile applications, content providers will be able to reach the largest audiences by displaying content in other applications. For example, a creator of a virtual reality tower defense game would have the best chances of reaching a large audience of potential customers by playing a video of the tower defense game in a different virtual reality game.

Retaining an immersive feel is important for virtual reality applications. An application publisher's ability to retain users, who may be customers, may be highly influenced by how immersive the application is. Any activity that breaks the flow of immersion threatens to cause user attrition.

Due to the importance of the immersive feel to virtual reality applications, it is difficult to provide outside content into an application in a manner that minimizes customer attrition. With browser and mobile applications, a pop-up or embedded video display does not have the same effect upon breaking immersion as such displays would have on a virtual reality application. For example, when a user plays a racing game in a virtual reality application, the experience is intended to make the user feel that the user is operating a vehicle. Thus, the virtual reality application would include a rendered three dimensional environment that allows the user to look around the inside of the user's virtual car and outside the user's virtual windows. If, during the execution of the racing application, a video featuring a shampoo commercial appeared directly in front of the user, the immersive feeling that the user is sitting in a virtual car would be lost.

Thus, there is a need for a method of displaying content in a virtual reality application in a manner that does not break the immersive feel of the virtual reality application.

SUMMARY

The appended claims may serve to summarize the present disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. STRUCTURAL OVERVIEW
3. GENERATING A VIRTUAL REALITY THEATER 3.1. DESIGN DATA
3.2. PROVIDED CONTENT
3.3. MODIFYING THE VIRTUAL REALITY THEATER
3.4. IMMERSIVE CONTENT DISPLAY
4. SERVER INTERACTIONS
5. HARDWARE OVERVIEW
6. APPLICATION DOWNLOADS

1. General Overview

Aspects of the disclosure generally relate to computer implemented techniques for generating a virtual reality environment for displaying content. In an embodiment, a virtual reality content management system receives design data from an application publisher. The virtual reality content management system uses the design data to generate a virtual reality environment that has a similar appearance to an application of the application publisher. The virtual reality content management system receives content and inserts the content into the virtual reality environment. The virtual reality content management system then displays the content in the virtual reality environment on a client computing device.

In an embodiment, a method comprises executing a digital graphical virtual reality application on a client computing device; while executing the digital graphical virtual reality application on the client computing device, receiving a request to download additional content at a future time; determining that the digital graphical virtual reality application has been terminated; based on the determining, displaying a notification on the client computing device that identifies the additional content; receiving a selection of the notification through the client computing device; sending a request to a marketplace application on the client computing device to cause the client computing device to download the additional content.

In an embodiment, a method comprises executing a digital graphical virtual reality application on a client computing device; while executing the digital graphical virtual reality application on the client computing device, receiving a request to download additional content at a current time; in response to receiving the request to download additional content at the current time, suspending the digital graphical virtual reality application; determining that the client computing device has been removed from a head of a user; in response to the determining, sending a request to a marketplace application on the client computing device to cause the client computing device to download the additional content.

2. Structural Overview

Figure 1:
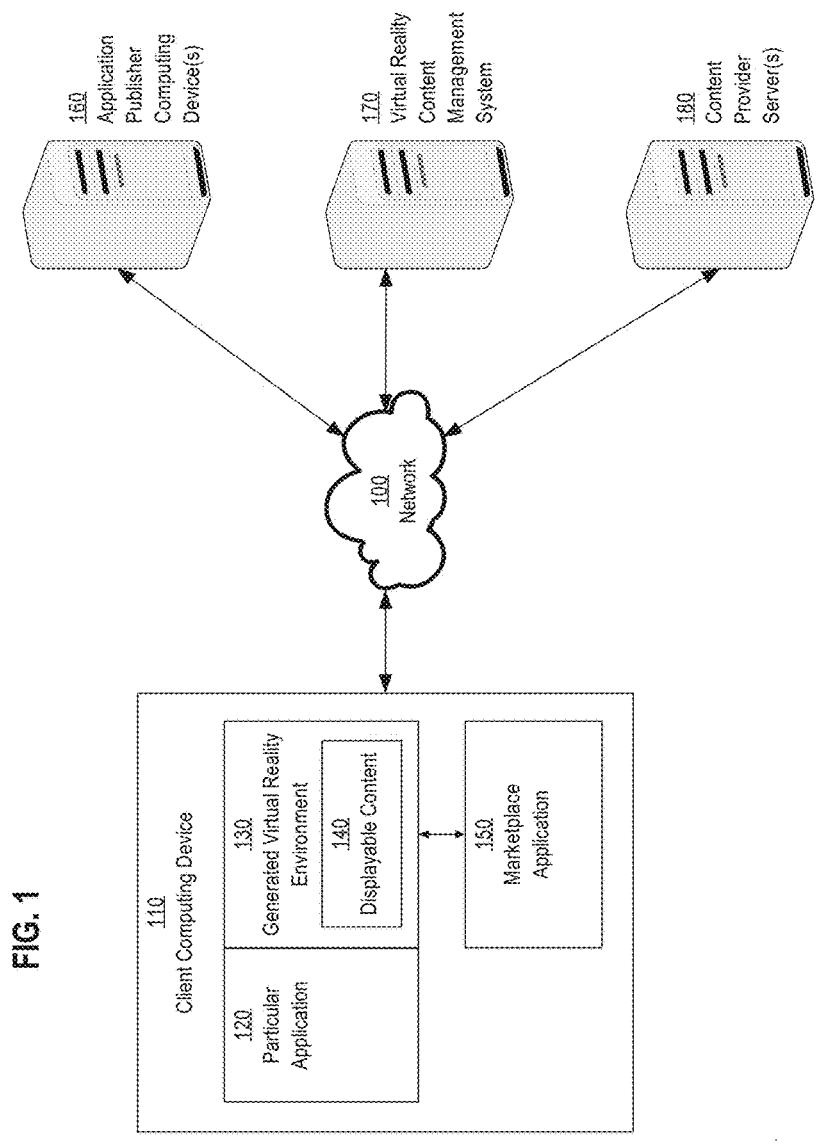
FIG. 1 illustrates an example network upon which embodiments may be implemented.

FIG. 1 illustrates an example network upon which embodiments may be implemented.

FIG. 1 comprises client computing device 110, application publisher computing device(s) 160, virtual reality content management system 170, and content provider server(s) 180, which are communicatively coupled over network 100.

Network 100 may be implemented by any medium or mechanism that provides for the exchange of data between the various elements of FIG. 1. Examples of network 100 include, without limitation, one or more networks, such as one or more Local Area Networks (LANs), one or more Wide Area Networks (WANs), one or more Ethernets or the Internet, or one or more terrestrial, satellite or wireless links. For purposes of illustrating a clear example, network 100 is shown as a single element, but in practice network 100 may comprise one or more local area networks, wide area networks, and/or internetworks. The various elements of FIG. 1 may also have direct (wired or wireless) communications links, depending upon a particular implementation.

Each of application publisher computing device(s) 160, virtual reality content management system 170, and content provider server(s) 180 may be implemented using a server-class computer or other computer having one or more processor cores, co-processors, or other computers. FIG. 1 depicts client computing device 110, application publisher computing device(s) 160, virtual reality content management system 170, and content provider server(s) 180 as distinct elements for the purpose of illustrating a clear example. However, in other embodiments more or less server computers may accomplish the functions described herein. For example, virtual reality content management system 170 may interact with a plurality of application publisher computing devices 160, a plurality of content provider servers 180, and/or a plurality of client computing devices 110. As another example, a single server computer may perform the functions of application publisher computing device(s) 160 and content provider server(s) 180. Additionally, application publisher computing devices 160 may be one or more of a smart phone, PDA, tablet computing device, laptop computer, desktop computer, workstation, or any other computing device capable of transmitting and receiving information and performing the functions described herein.

Client computing device 110 may be any computing device that is capable of displaying a virtual reality environment and interacting over a network with virtual reality content management system 170. Client computing device may be a smart phone, personal computer, tablet computing device, PDA, laptop, or any other computing device capable of transmitting and receiving information and performing the functions described herein. In an embodiment, client computing device is a head mounted display for displaying virtual reality applications. Additionally and/or alternatively, client computing device may be communicatively coupled to a head mounted display for displaying virtual reality applications. For example, a head mounted display may be communicatively coupled to a personal computer which performs the receiving and transmitting functions described herein and further causes displaying, through the head mounted display, a virtual reality application.

In an embodiment, client computing device 110 executes a particular application 120, which may be a virtual reality display, virtual reality game, modified reality display, modified reality game, 360 degree video, or 3D video, as some examples. Client computing device 110 may receive particular application 120 from application publisher computing device(s) 160 over network 100. Additionally and/or alternatively, particular application 120 may execute on client computing device 110 from one or more computer readable media storing instructions which, when executed by client computing device 110, cause client computing device 110 to execute the particular application.

In an embodiment, client computing device 110 executes the generated virtual reality environment 130. Client computing device 110 may receive the generated virtual reality environment 130 from virtual reality content management system 170 over network 100. Additionally and/or alternatively, client computing device 110 may receive the generated virtual reality environment 130 from application publisher computing device(s) 160 and/or from one or more computer readable media storing instructions which, when executed by client computing device 110, cause client computing device 110 to execute the generated virtual reality environment 130.

In an embodiment, the generated virtual reality environment 130 contains displayable content 140. Displayable content 140 may include a two dimensional video, a two dimensional game or game demonstration, a three dimensional video, a 360 degree video, a virtual reality game or game demonstration, and/or a three dimensional game or game demonstration, as some examples, in various embodiments. In an embodiment, client computing device 110 receives displayable content 140 from virtual reality content management system 170 over network 100 with virtual reality environment 130. Additionally and/or alternatively, client computing device 110 may initially receive or execute virtual reality environment 130 and receive displayable content 140 from virtual reality content management system 170 upon loading or execution of virtual reality environment 130. In an embodiment, generated virtual reality environment 130 is configured to display displayable content 140 received directly from content provider server(s) 180 over network 100.

In an embodiment, client computing device 110 additionally executes a marketplace application 150. Marketplace application 150 may interact with application programming interfaces (APIs) of content provider server(s) 180 over network 100 to cause additional applications to be downloaded from content provider server(s) 180 to client computing device 110. In an embodiment, the generated virtual reality environment 130 contains instructions which, when executed by the client computing device 110, causes the client computing device to execute the marketplace application 150 and navigate to an application hosted by content provider server(s) 180 and associated with displayable content 140. The instructions may also cause client computing device 110 to download and install the application hosted by content provider server(s) 180 through the marketplace application.

Application publisher computing device(s) 160 is communicatively coupled to virtual reality content management system 170 via one or more networks, which may be implemented in the manner previously described for network 100. Application publisher computing device(s) may be configured to send design data to virtual reality content management system 170 over network 100. Additionally, application publisher computing device(s) 160 may be further configured to provide particular application 120 to client computing device 110 over network 100.

Virtual reality content management system 170 is communicatively coupled to application publisher computing device(s) 160, client computing device 110, and content provider server(s) 180. Virtual reality content management system 170 may be configured to receive design data from application publisher computing device(s) 160, receive displayable content 140 from content provider server(s) 180 and cause display of generated virtual reality environment 130 on client computing device 110 over network 100. In an embodiment, virtual reality content management system 170 is configured to generate virtual reality environments for displaying content, modify virtual reality environments with design data, and insert particular content into the virtual reality environment. While virtual reality content management system 170 is depicted as one server computing device, in an embodiment multiple server computers perform the functions described herein. For example, a first server computer may interact with application publisher computing device(s) 160 to generate a virtual reality environment while a second server computer may interact with client computing device 110 to cause display of the virtual reality environment with particular content.

Content provider server(s) 180 is communicatively coupled to virtual reality content management system 170. Content provider server(s) 180 may be configured to provide displayable content 140 to virtual reality content management system 170. Content provider server(s) 180 may further be configured to provide additional content, such as three dimensional videos, 360 degree videos, and/or virtual reality game demonstrations. Additional content may also include executable content, such as three dimensional models to be placed within the virtual reality environment. Content provider server(s) may be further configured to provide instructions to virtual reality content management system 170 that cause a client computing device to download an application from content provider server(s) 180. In an embodiment, content provider server(s) may be configured to provide displayable content 140 and download instructions directly to client computing device 110. Content provider server(s) may also be configured to receive requests for one or more applications from client computing device 110 and to send one or more applications to client computing device 110 over network 100.

Figure 2:
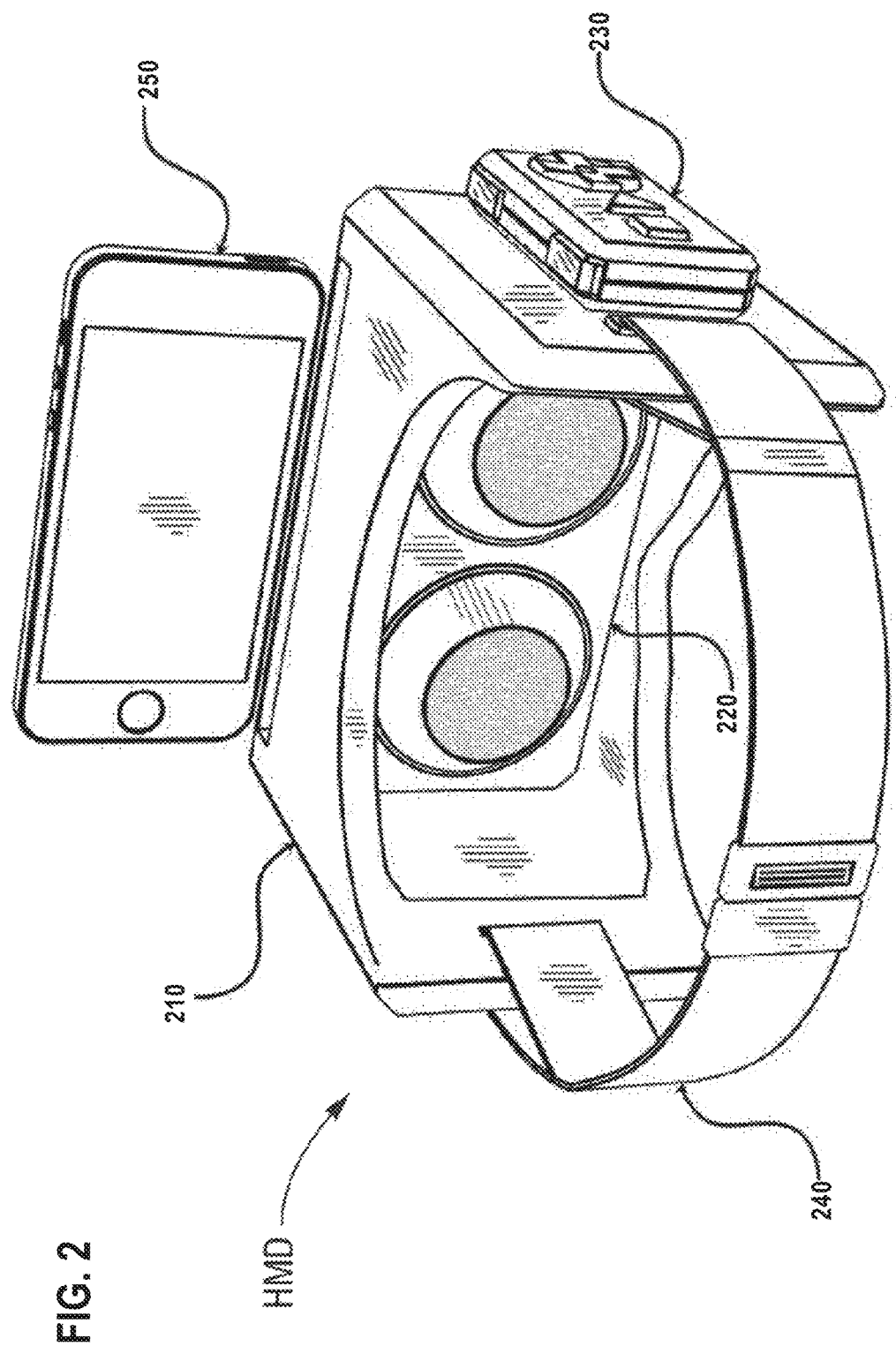
FIG. 2 illustrates an example of a head mounted display for displaying virtual reality applications.

FIG. 2 illustrates an example of a head mounted display for displaying virtual reality applications. While FIG. 2 depicts an example head mounted display which utilizes a smartphone, the systems and methods described herein may also be applied to head mounted displays and other versions of generating virtual reality environments that do not rely on a smartphone device. For example, the methods described herein may be performed using premanufactured head mounted displays, such as the OCULUS RIFT.

The device of FIG. 2 comprises a main body 210 which may be fitted with a lens assembly 220, a strap 240 which securely attaches the main body to the user's a head, a re-attachable remote controller 230, and an external mobile computing device 250 to be secured in the main body. The main body 210 as disclosed herein may be easily adapted to fit any of a number of mobile computing device 250 shapes and sizes, such as, but not limited to, the SAMSUNG GALAXY 4, the IPHONE 5, and the HTC ONE. As noted, strap 240 in FIG. 2 may be used to securely attach the main body to the user's head, but other or additional means and methods may be used. For example, main body 210 could be incorporated into a helmet-like device which is secured to the top a user's head without a strap. The device may also include other means of interacting with the mobile computing device within such as one or more levers coupled to a stylus which is configured to be incident on a touch screen of the mobile computing device or one or more holes in the device through which a user may interact with the mobile computing device.

External mobile computing device 250 may include a central processing unit (CPU), a screen, and wireless communication functionality. External mobile computing device 250 may be capable of running applications for use with the head mounted device. External mobile computing device 250 may incorporate one or more motion sensors, for example, gyroscopes, gravitometers, magnetometers, accelerometers, and similar sensors, which may be relied upon, at least in part, in determining the orientation and movement of the overall head mounted display. In some embodiments, one or more additional sensors are located on main body 210, such as light or pressure sensors which are used to determine whether the head mounted display is being worn by a user.

Lens assembly 220 may be configured to allow three dimensional display through a particular screen. For example, each lens of lens assembly 220 may be configured to focus on a different portion of the mobile computing device screen. The mobile computing device 110 may display a stereoscopic image by displaying a left portion of a stereoscopic image on a left portion of the screen of the mobile computing device 110 and a right portion of the stereoscopic image on a right portion of the screen of the mobile computing device. By displaying slightly different images to each eye, the device allows creation and display of virtual reality, modified reality, 360 degree video, and 3D video.

3. Generating a Virtual Reality Theater

Figure 3:
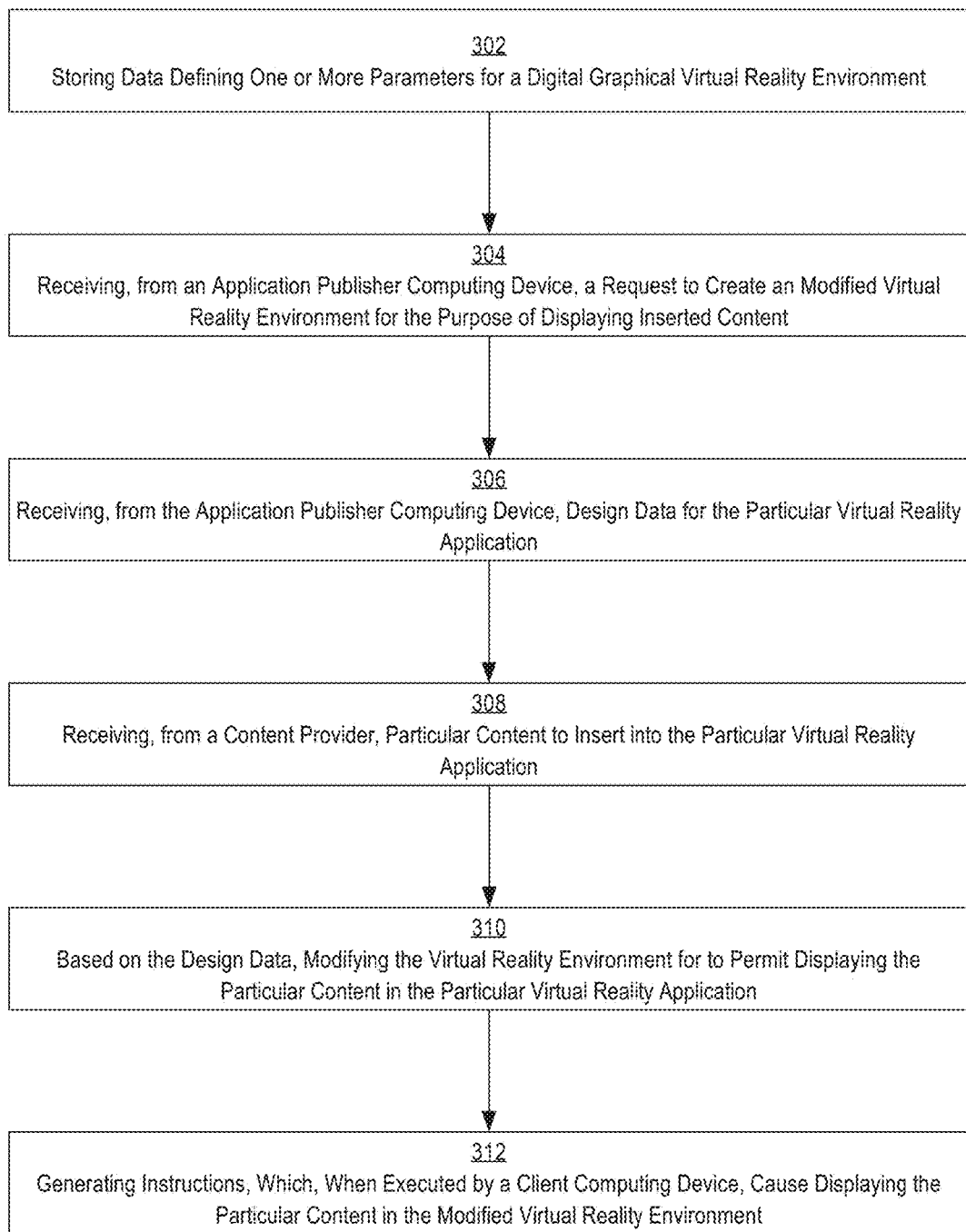
FIG. 3 illustrates a flow diagram illustrating an example method of generating and displaying a modified virtual reality environment for displaying particular content in a particular application.

FIG. 3 illustrates a flow diagram illustrating an example method of generating and displaying a modified virtual reality environment for displaying particular content in a particular application. FIG. 3, and each other flow diagram in this disclosure, is intended as an example of a programmable algorithm that may be implemented using one or more of the application publisher computing device(s) 160, virtual reality content management system 170, and content provider server(s) 180 under control of one or more computer programs that are configured to execute the operations that are described in connection with the flow diagrams. The programs may be created using any computer program development environment that is now known or contemplated at the time of this writing, including but not limited to JAVA, C++, OBJECTIVE-C, C, C#, PASCAL, alone or in combination with scripting languages such as PERL, JAVASCRIPT and the like. The programs, alone or in combination, may contain source language instructions, pseudo-code, and/or machine language instructions which when executed cause performing a computer-implemented method comprising:

executing a digital graphical virtual reality application on a client computing device;

while executing the digital graphical virtual reality application on the client computing device, receiving a request to download additional content at a future time;

determining that the digital graphical virtual reality application has been terminated;

based on the determining, displaying a notification on the client computing device that identifies the additional content;

receiving a selection of the notification through the client computing device;

sending a request to a marketplace application on the client computing device to cause the client computing device to download the additional content;

in response to receiving the selection of the notification, sending, to a virtual reality content management system, over one or more networks, data indicating a selection of the notification;

while executing the digital graphical virtual reality application, receiving a request to view content from a content provider server;

requesting, over a network from a virtual reality content management system, a virtual reality environment for the purpose of displaying inserted content in the digital graphical virtual reality application;

receiving, from the virtual reality content management system over one or more networks, a virtual reality environment comprising a content display location in which content can be displayed and particular content to display in the content display location;

displaying, via a digital display of the client computing device, the virtual reality environment;

displaying the particular content in the content display location of the virtual reality environment;

displaying, with the particular content, an option to download the additional content at a future time;

receiving the request to download additional content at the future time through a selection of the option to download the additional content;

wherein the virtual reality environment further comprises design data associated with the digital graphical virtual reality application;

wherein the design data comprises one or more environment textures, three dimensional models, and surface material properties that are collectively sufficient to permit generating a fully rendered three dimensional virtual reality environment;

wherein the particular content is two dimensional content;

wherein the virtual reality environment is a virtual three dimensional environment comprising a fixed virtual viewer location for viewing the particular content and a virtual screen for displaying the particular content;

displaying the virtual reality environment only after the digital graphical virtual reality application reaches a transition point;

displaying the virtual reality environment only after the digital graphical virtual reality application reaches a change in levels of a game;

executing a digital graphical virtual reality application on a client computing device;

while executing the digital graphical virtual reality application on the client computing device, receiving a request to download additional content at a current time;

in response to receiving the request to download additional content at the current time, suspending the digital graphical virtual reality application;

determining that the client computing device has been removed from a head of a user;

in response to the determining, sending a request to a marketplace application on the client computing device to cause the client computing device to download the additional content;

while executing the digital graphical virtual reality application, receiving a request to view content from a content provider server;

requesting, over a network from a virtual reality content management system, a virtual reality environment for the purpose of displaying inserted content in the digital graphical virtual reality application;

receiving, from the virtual reality content management system over one or more networks, a virtual reality environment comprising a content display location in which content can be displayed and particular content to display in the content display location;

displaying, via a digital display of the client computing device, the virtual reality environment;

displaying the particular content in the content display location of the virtual reality environment;

displaying, with the particular content, an option to download the additional content at a current time;

receiving the request to download additional content at the current time through a selection of the option to download the additional content.

At step 302, data defining one or more parameters for a digital graphical virtual reality environment is stored. For example, virtual reality content management system 170 may store data that can be used to generate a virtual reality environment or place restrictions on the generation of a three dimensional environment. In an embodiment, the data identifies one or more of a location for a viewer, a path to the location for the viewer, a location for a screen to display content, a size of the screen, and one or more reserved locations. A reserved location, as used herein, refers to a location to be left empty in a three dimensional environment. For example, to allow a client device to properly display content to a user, a space between the location for the viewer and the location for the screen may be a reserved location, such that objects are not placed within the space, thereby obscuring a view of the screen.

The data may include a software development kit (SDK) which allows an application publisher to upload a raw scene to virtual reality content management system 170. For example, a tool kit may allow uploads of files created with three dimension modeling software, such as MAYA, BLENDER, or UNITY. Additionally, an SDK may provide a means for an application publisher to generate a raw scene subject to one or more parameters. For example, an SDK may allow an application publisher to generate a three dimensional scene subject to restrictions, such as screen size or type and location of the viewer. In an embodiment, an SDK includes tools for selecting texture types, three dimensional models, movement logic, and other graphical elements to add to an already generated three dimensional environment.

Figure 4:
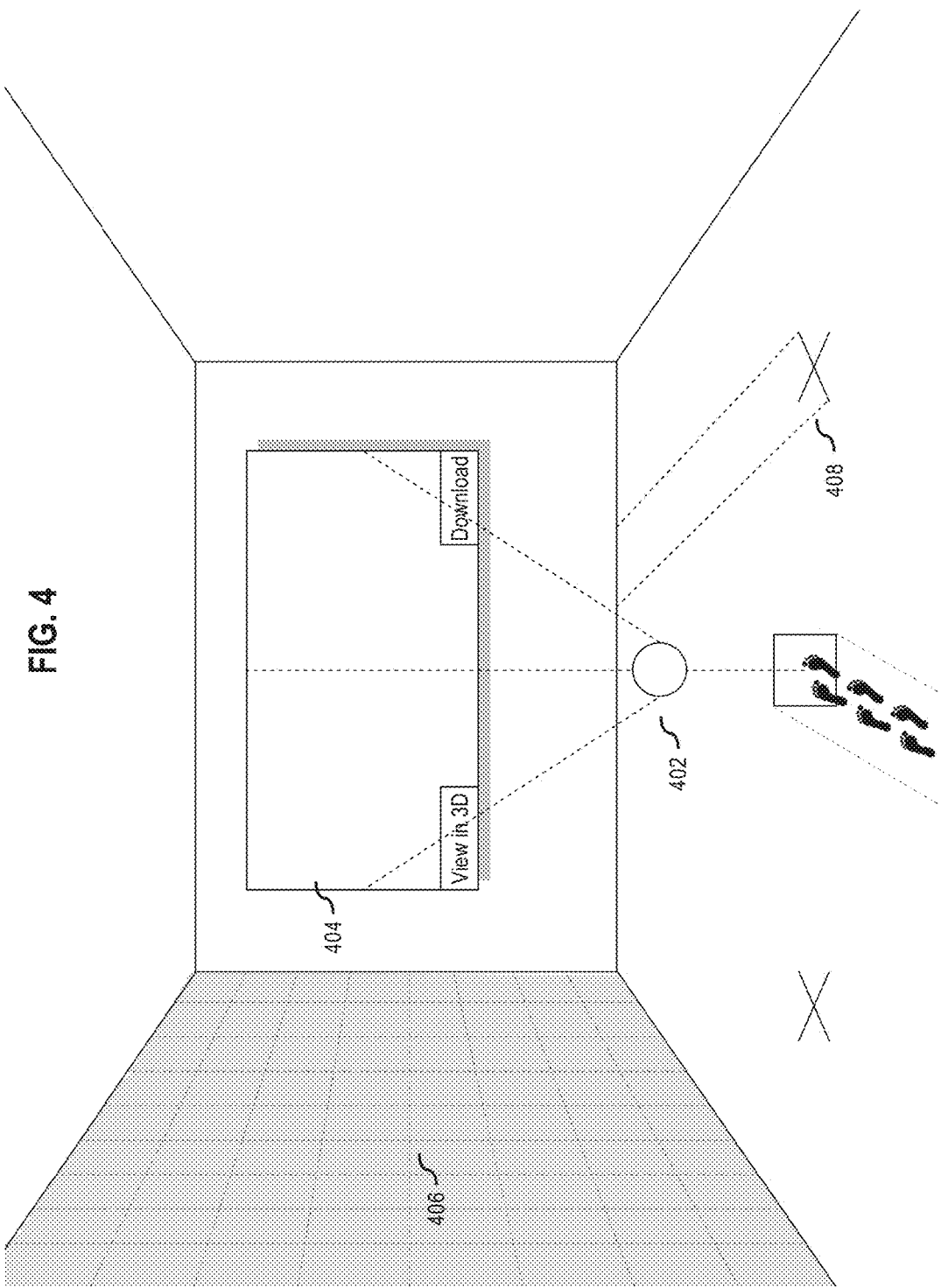
FIG. 4 depicts an example virtual reality environment that may be modified using design data of an application publisher.

FIG. 4 depicts an example virtual reality environment that may be modified using design data of an application publisher. In an embodiment, a pre-generated virtual reality environment includes viewer location 402, a screen location 404, and one or more bounds 406. While FIG. 4 depicts walls with a ceiling, in an embodiment the virtual reality environment is a fully rendered three dimensional environment without physical bounds. Additionally, the pre-generated virtual reality environment may include reserved locations 408.

In an embodiment, virtual reality content management system 170 stores data for one or more default environments. For example, a default environment may be designed to look like a movie theater or cinema auditorium. The example of a theater is provided herein to illustrate one specific possible implementation, but other embodiments may generate environments having other appearances. Examples include auditoriums, stadiums, billboards, outdoor giant screens, signs, museums, paintings, etc.

When a theater environment is used, the theater may include three dimensional models of movie seats, curtains, and other movie theater elements. In an embodiment, reserved locations 408 may be designed to contain additional models. For example, if the theater includes character models in the movie seats, reserved locations 408 may be empty seats. While reserved locations 408 are depicted as locations on either side of viewer location 402, in different embodiments, reserved locations 408 may be set on the walls, the ceiling, around screen location 404, or in other open spaces. For example, the space between viewer location 402 and screen location 404, denoted by dotted lines, may be a reserved location. As another example, a path between screen location 404 and a reserved location may also be a reserved location.

The data may define absolute parameters, proportional parameters, and/or ranges of parameters. An absolute parameter may define specific sizes and locations. For example, an absolute parameter may define a screen's dimensions as 1920×1080 pixels and a distance between the viewer and the screen as fifteen feet. A proportional parameter may define sizes and locations in relation to one another. For example, a proportional parameter may define the screen size as large enough to consume 65% of a particular view of viewer. Thus, while the location and distance of the viewer from the screen may vary from environment to environment, the variance of location would be matched by a variance in screen size, such that the screen always takes up 65% of the particular view. Proportional parameters allow the application publisher to better customize the experience to a particular application. For example, a first application publisher may wish the screen to appear on a virtual monitor at a virtual desk in front of the view, while a second publisher may wish for the screen to appear on the surface of a nearby planet. A range of parameters may define additional options for the application publisher. For example, a range of parameters may define a distance to the screen as between 10 and 20 feet or define a screen size as between 65% and 85% of a particular view of the viewer.

In an embodiment, the one or more bounds 406 represent limits of movement within the virtual reality environment. For example, while in some embodiments viewer location 402 is locked in the virtual reality environment, in other embodiments the environment permits movement of viewer location 402 during displaying of the content. One or more bounds 406 may represent locations in the virtual reality environment past which the viewer location may not move. In the example of the movie theater, the walls of the movie theater may act as one or more bounds 406. In another example, one or more bounds 406 may be invisible boundaries. For example, movement boundaries may be set in an open area such that a viewer can see past the boundaries, but not move past the boundaries. Thus, if the environment was an open desert, while the environment may include models and textures beyond the movement boundaries, the viewer would be unable to move past the movement boundaries.

In some embodiments, the virtual reality environment does not include bounds 406. For example, the parameters of the virtual reality environment may identify a static location for viewer location 402 such that viewer location 402 does not move during execution of the displayable content. Additionally, the parameter of the virtual reality environment may allow an application publisher to create design data for an open environment without walls. Thus, an environment of an open desert with a static viewer location 402 may not utilize bounds 406.

In an embodiment, the virtual reality environment also includes a path from an initial entrance point of the virtual reality environment to viewer location 402. In embodiments where viewer location 402 is a static location, the path from the initial entrance point of the virtual reality environment to viewer location 402 allows for a seamless transition to the virtual reality environment from a different application. For example, if a viewer is playing a racing game, the path to viewer location 402 may comprise a path that the user's car travels across to reach the viewer location.

3.1. Design Data

Referring again to FIG. 3, at step 304, a request to create a modified virtual reality environment for the purpose of displaying inserted content is received. For example, application publisher computing device 160 may send a request through the application programming interfaces (APIs) of virtual reality content management system 170 for a virtual reality environment to display content. In an embodiment, application publisher computing device 160 requests the stored data defining one or more parameters for the digital graphical virtual reality environment. For example, application publisher computing device 160 may request access to a software development kit for creating a three dimensional environment or to one or more tools for uploading a three dimensional scene to virtual reality content management system 170. Additionally, virtual reality content management system 170 may provide a formal specification for the generation and implementation of a graphical virtual reality environment which contains one or more limitations. In an embodiment, virtual reality content management system 170 provides a web based interface for sending a request to create the modified virtual reality environment. The web based interface may provide options for generating publisher identification, such as an application ID to identify a particular application and a placement ID to identify a particular placement within the application. By generating an application ID separate from a placement ID, virtual reality content management system 170 allows an application publisher to designate different types of design date for placement at different places within the application.

Virtual reality content management system 170 may store the application ID and placement ID in association with application publisher computing device 160 and/or with a particular application. Application publisher computing device 160 may identify design data for the virtual reality environment and/or content to be placed in the virtual reality environment using the application ID and placement ID. Application publisher computing device 160 may also insert the application ID and placement ID into a particular application to cause a computing device executing the particular application to make a call to virtual reality content management system 170 and/or an associated content server.

At step 306, design data for the particular virtual reality application is received. For example, virtual reality content management system 170 may receive one or more files of virtual reality environments, created by third party software development kits, such as Maya®, Blender, or Unity. Additionally and/or alternatively, virtual reality content management system 170 may receive semi-structured data identifying three dimensional models, surface textures and properties, and/or other custom graphical appearances for an environment. For example, the design data may identify a color and texture of the walls of a theater and a model of a character or item within the movie theater. Additionally, design data may identify the speed at which a character moves through the environment, such as along a path from an entrance point to a viewer location. For example, a car from a racing game may move along a path to a viewer location faster than a character from an adventuring game traveling on foot. The design data may specify the length of the path from the initial entrance point and the speed of traversal. Thus, a character in a car may move at a faster speed across a longer distance than a character traveling on foot.

In an embodiment, the received design data further comprises definitions for making calls to an application programming interface of an associated application. The definitions allow the application publisher to identify one or more models or textures that are determined based on information in a corresponding application, such as an application state. In some embodiments, the models and textures are originally identified as part of the design data, but selected based on information received from the executing application. For example, a racing game may include multiple distinct levels. The received design data may include different environment details corresponding to different levels of the racing game. At the time of execution of the virtual reality environment, one or more calls may be made to the racing game to determine a current or last executed level. The different environment details may then be determined based on a level executing in the racing game at the time.

In some embodiments, models and textures may be provided by the executing application. For example, a particular role playing game may include an option to customize a player's party with different characters. The different characters may also have customizable appearances and items. The specification for the generation of design data may include an option to identify models of characters by making calls to the role playing game to identify the characters in the player's party and the customizations of the characters. Thus, when the virtual reality environment is executed, one or more calls may be made to the role playing game to identify the current models of the character's party members and insert the models into identified positions in the virtual reality environment.

Models and textures provided as design data may also include models and textures associated with the viewer. For example, if the virtual reality environment is designed to match a racing a game, the models and textures of a player's car may be incorporated into the modified virtual reality environment. As another example, a character's outfit may be incorporated into the modified virtual reality environment. Thus, if the user is watching a movie that includes climbing Mount Everest, the design data may identify a snow jacket as clothing worn by the viewer. When the viewer enters the modified virtual reality environment, the model of the user that views the displayed content may be wearing a snow jacket. As discussed previously, models associated with the user character may also be identified by an application state of a currently executing application in a similar manner.

Similar methods may be applied to non-interactive audio visual media, such as virtual reality movies. For example, the design data for a particular virtual reality movie may identify models and/or environmental elements that are determined based on a state of the movie. Thus, if a particular character is only in the movie until the end of the second act of the movie, the design data may identify a particular timestamp of the movie that coincides with the loss of the particular character. The design data may further identify a model for that character to be placed in the modified virtual reality environment if, at the time of execution of the modified virtual reality environment, the timestamp of the movie is prior to the particular timestamp. Additionally, if a particular character or setting changes during the movie, the design data may identify a first model of the particular character or setting before the change and a second model of the particular character or setting after the change.

3.2. Provided Content

At step 308, particular content for insertion into the particular virtual reality application is received. For example, content provider server 180 or application publisher computing device 160 may send displayable content 140 to virtual reality content management system 170. Content provider server 180 may send content directly to virtual reality content management system 170 with a request to display the content from the particular application. Application publisher computing device 160 may authorize virtual reality content management system 170 to display the particular content within the application. Additionally and/or alternatively, application publisher computing device 160 may send the particular content directly to virtual reality content management system 170 with a request to cause display of the particular content from the particular application.

While in an embodiment the receipt of the particular content occurs after the receipt of design data and before the modifying the virtual reality environment, in other embodiments the particular content may be received at any time before the execution of the virtual reality environment. For example, the modified virtual reality environment may be initially created to display content from any source. Content may then be received and authorized for displaying through the modified virtual reality environment. Additionally and/or alternatively, virtual reality content management system 170 may initially receive content from one or more content provider servers. Virtual reality content management system 170 may then receive a request from application publisher computing device 160 to generate a modified virtual reality environment based on design data for a particular application along with an identification of the initially received content to display in the modified virtual reality environment.

In an embodiment, particular content comprises audio visual content to be played on a screen. For example, the particular content may be a video advertisement for a different virtual reality application or a trailer for a movie. The received particular content may be configured to be played on a screen of a particular size or aspect ratio. For example, virtual reality content management system 170 may identify to the content provider a particular size or aspect ratio of the screen in the virtual reality environment to allow the content provider to select particular content that matches the screen. Additionally and/or alternatively, virtual reality content management system 170 may receive multiple types of content from a particular content provider, such as a particular video with multiple resolutions and aspect ratios. For each modified virtual reality environment, virtual reality content management system 170 may select the content that best fits the screen. The audio visual content may also comprise 3D content, such as 3D video.

In an embodiment, the particular content includes three hundred and sixty degree content. For example, virtual reality content management system 170 may receive a two dimensional video and a 360° video from content provider server 180. A three dimensional video may include a video taken with a 360° camera or a video created in a virtual reality environment through the use of three dimensional models and content. 360° may also include demonstrations for an application related to the particular content. For example, if the particular content is a trailer for a particular game, the related 360° content may include a playable demonstration of the particular game.

In an embodiment, the particular content includes additional content for placement within the modified virtual reality environment. The additional content may conform to particular parameters such that it may be placed in one of reserved locations 408. For example, reserved locations 408 may include various other two dimensional locations, such as banners around the screen or posters situated along a wall of the virtual reality environment. The additional content may include two dimensional images to be placed within the banners or on the posters. Additionally, the additional content may include three dimensional models that are configured to fit within reserved locations 408. For example, if a reserved location to the left of the viewer location is a vertical rectangular parallelepiped with a length and width of 3 ft, then a model as additional content may be a maximum of 3 ft long and 3 ft wide. Thus, a received model for the particular reserved location from a first content provider may be a character model of a person that fits within the space of the vertical rectangular parallelepiped while the received model for the particular reserved location from a second content provider may be a can of soda that fits within the space of the vertical rectangular parallelepiped.

In an embodiment, the particular content includes additional executable content for placement within the modified virtual reality environment. Unlike static models or pictures, executable content may be configured to move through the virtual reality environment and/or to interact with the viewer. For example, reserved locations 408 may include a path from a particular location to the screen of the modified virtual reality environment. Virtual reality content management system 170 may identify to content provider server 180 a location and size of the path with respect to the size of the screen. Content provider server 180 may generate executable content which moves along the path from the screen to a particular location. For example, a model of a polar bear may be configured to exit the screen, walk along a reserved location, and sit next to the viewer location.

By generating reserved locations and identifying the reserved locations to application publisher computing device 160 and content provider server 180, virtual reality content management system 170 creates a method for allowing a plurality of content providers to generate content which interacts with a plurality of worlds created by a plurality of application publishers. For instance, in the polar bear example described above, one modified virtual reality environment may be a race track while a second modified virtual reality environment may be a post-apocalyptic wasteland. In both modified virtual reality environments, the same polar bear would be capable of exiting the screen and walking through the modified virtual reality environment to a place next to the viewer location. Additionally, if a different content provider created a model of a tree that falls out of the screen along the same path, the tree could be added to the modified virtual reality environment of the race track as well as the modified virtual reality environment of the post-apocalyptic wasteland.

In an embodiment, the executable content may include interactive content. For example, virtual reality content management system 170 may identify to content provider server 180 one or more interactions a viewer may have with the additional content, thereby allowing content provider server 180 to identify responses of the additional content to the interactions. For example, content provider server 180 may indicate that a model of polar bear sitting in reserved location 408 performs a wink action at the viewer in response to the viewer focusing on the polar bear for longer than five seconds.

Content provider server 180 may additionally send to virtual reality content management system 170 instructions which, when executed by a client computing device, cause the client computing device to download an application from content provider server 180. Additionally and/or alternatively, content provider server 180 may provide a link to a website or application store where a viewer may download and/or purchase an application. The link may comprise a uniform resource locator (URL) and/or instructions which, when executed by the client computing device, cause the client computing device to execute an application store application and navigate to a particular application. In some embodiments, content provider server 180 identifies an application hosted on an application store to be associated with the provided content.

3.3. Modifying the Virtual Reality Theater

At step 310, based on the design data, the virtual reality environment is modified to permit displaying the particular content in the particular virtual reality application. For example, virtual reality content management system 170 may use the design data to alter an initial virtual reality theater. Altering the initial virtual reality theater may comprise adding design elements, such as textures, surface properties, and three dimensional models, to an existing theater environment.

In an embodiment, modifying the virtual reality theater comprises storing a virtual reality environment so that it can access content of the content provider. For example, virtual reality content management system 170 may analyze an uploaded virtual reality environment received from application publisher computing device 160. Analyzing the virtual reality environment may comprise identifying a viewer location, identifying a screen location, identifying a size of the screen, identifying surface properties, and/or determining that one or more reserved locations and one or more views to the one or more reserved locations are unobstructed. Virtual reality content management system 170 may then attach metadata to the virtual reality environment which identifies the locations for received content and save the virtual reality environment in a particular format, such as a binary format, so that it can be easily called by virtual reality content management system 170. In an embodiment, storing the virtual reality environment comprises associating the virtual reality environment with a particular Application ID and a particular Placement ID.

In an embodiment, virtual reality content management system 170 modifies the virtual reality environment in response to a request from a client computing device to display the virtual reality environment. For example, virtual reality content management system 170 may, in response to receiving a request to display the virtual reality environment, identify particular content to be displayed in the virtual reality environment and modify the virtual reality environment to display the particular content. Thus, an application publisher may authorize a plurality of different types of content to be displayed in the virtual reality environment. Virtual reality content management system 170 may execute digitally programmed logic to select one of the different types of content to display in a particular execution of the virtual reality environment. The selection logic may include pseudo-random selection, weighted pseudo-random selection, and/or ordered selection. For example, an application publisher may select first particular content to be displayed twice as often as second particular content. An ordered approach to displaying content may include displaying first particular content in response to a first and second received request to display content and displaying second content in response to a third request to display content.

Additionally and/or alternatively, modifying the virtual reality environment may comprise identifying one or more elements of the virtual reality environment based on a current state of the application. For example, if the application publisher identified one or more elements of the virtual reality environment that are dependent on the state of the application, virtual reality content management system 170 may select particular elements of the virtual reality environment to display based on data identifying a particular application state. In an embodiment, virtual reality content management system 170 receives the data necessary to make selections of design elements from the call to display the virtual reality environment. For example, virtual reality content management system 170 may identify to application server 160 one or more instructions which, when executed by a client computing device, cause the client computing device to identify the application state and to input the identified application state in the request for the virtual reality environment from virtual reality content management system. For example, if a particular element of a virtual reality environment is dependent on a character, Andrew Ryan, being alive in a particular game, the call to load content would include data indicating whether Andrew Ryan is still alive in the particular game.

3.4. Immersive Content Display

At step 312, instructions are generated which, when executed by a client computing device, cause displaying the particular content in the modified virtual reality environment. For example, virtual reality content management system 170 may generate instructions which may be placed in an application which causes a device executing the application to make a call to virtual reality content management system 170 to request display of the modified virtual reality environment. Additionally and/or alternatively, virtual reality content management system 170 may develop an executable virtual reality environment program to be sent directly to the client computing device. Upon executing the virtual reality environment program, the client computing device may send a request to virtual reality content management system 170 to insert particular content into the executable virtual reality environment program.

In an embodiment, the instructions that cause displaying the particular content in the modified virtual reality environment are configured to be called during a transition point in a particular application, such as a scene change in a three dimensional movie or game. For example, the instructions to display the modified virtual reality environment may be executed when a display in a particular application fades out. By inserting the modified virtual reality environment in portions of an application that already include scene changes or other transitions, modified virtual reality content management system 170 is able to minimize a loss of immersion caused by displaying content within the particular application. In contrast, a display of the modified virtual reality environment during an action filled portion of a game may cause a game player to feel less immersed in the action of the game.

In an embodiment, the instructions are configured to cause displaying the particular content in the modified virtual reality environment at the end of a level of a game. For example, a virtual reality environment for displaying content may be displayed in a racing game at the end of a race. When the modified virtual reality environment is configured to execute at set points in an application, either the virtual reality generator or an application publisher is able to create a smoother transition from an application into the modified virtual reality environment from the application. For example, in the case of the racing game, an application may display a turnoff at the end of the race track. As the player's car drives on the turnoff, the modified virtual reality environment may load in front of the player so that the car is able to appear to drive directly from the application to a viewer location in the modified virtual reality environment.

In an embodiment, the instructions are configured to cause displaying the particular content in the modified virtual reality environment in response to a selection by a user of the client computing device. The selection by the user to view content in the modified virtual reality environment may be made in response to an offer of application content in return for viewing the particular content. For example, in a first person shooter, the application may offer the user a scope for the user's rifle in return for the user watching an advertisement for a related application. If the user chooses to accept the offer, the user may select an option to view the particular content. In response to receiving a selection of the offer, client computing device 110 may send a request to virtual reality content management system 170 for a modified virtual reality environment to display the particular content.

To increase the immersive feel of a virtual reality application, an application publisher or the virtual reality content management system may create access points for transitions between the application and the virtual reality environment for displaying content. For example, an application in which a user explores a house may include a door to a room for displaying content. When the door is opened in the application, the generated virtual reality environment may be displayed on the other side of the door. As another example, a thicket in a forest may be an access point for a transition between the application and the virtual reality environment for displaying content. The client computing device may transition from the application to the virtual reality environment for displaying content when the display shows the user moving past the thicket.

In an embodiment, displaying the particular content in the modified virtual reality environment further comprises displaying an option to download or purchase a related application associated with the particular content. For example, the virtual screen in the modified virtual reality environment may display an option to download or purchase the related application. Upon receiving a selection of the option to download or purchase the related application, the client computing device may send a request to virtual reality content management system or to content provider server(s) to download or purchase the related application. The option may be selectable through a focus on the option. For example, as a user's head moves, the central focus of the screen shifts. If the central focus of the screen remains on the download option for longer than a specified period of time, such as five seconds, the application may determine that the download option has been selected.

Virtual reality content management system 170 may insert into the modified virtual reality environment instructions, which when executed by the client computing device, cause the client computing device to request an application download from content provider server 180. The instructions may cause the client computing device to send the request and begin the application installation with minimal effects on the immersive experience of the user. For example, the display of client computing device 110 may continue to show the modified virtual reality environment displaying the particular content while the application downloads from content provider server 180 in the background.

Displaying the content in the modified virtual reality environment may further comprise displaying an option to view three dimensional content. The option to view three dimensional content allows for a smooth transition from a particular application to three dimensional content received from a content provider. For example, a transition directly from the front seat of a car in a racing game to a three dimensional video of climbing Mount Everest would be extremely jarring to a user. In contrast, the modified virtual reality environment may act as a transition point from the racing game to the three dimensional video. In an embodiment, the user would enter the transition point of the modified virtual reality environment which includes design elements from the executing application, such as the race track and cars, and displays two dimensional content received from a content provider, such as a video of a person climbing Mount Everest. While the video is being displayed, the user may select the option to watch three dimensional content, thereby allowing the video that's being displayed to take over the entire screen of the user experience. When the three dimensional content ends, the client computing device may transition back to the modified virtual reality environment with the two dimensional content ending at a same position. This further allows the user to smoothly transition from the three dimensional content back into the executing application.

In an embodiment, virtual reality content management system 170 selects a type of content to display in the modified virtual reality environment based on one or more capabilities of the client computing device. For example, the client computing device may send, along with the application, information identifying a type of internet connection. If the client computing device is connected by a slow cellular connection with low bandwidth, virtual reality content management system 170 may use two dimensional video with limited to no executable content. If the client computing device is connected through a high speed connection, such as cable or Wi-Fi, virtual reality content management system 170 may select a higher quality video, such as a 3D or 360° video, or may use additional interactive elements, such as additional design content or executable received content.

4. Server Interactions

Figure 5:
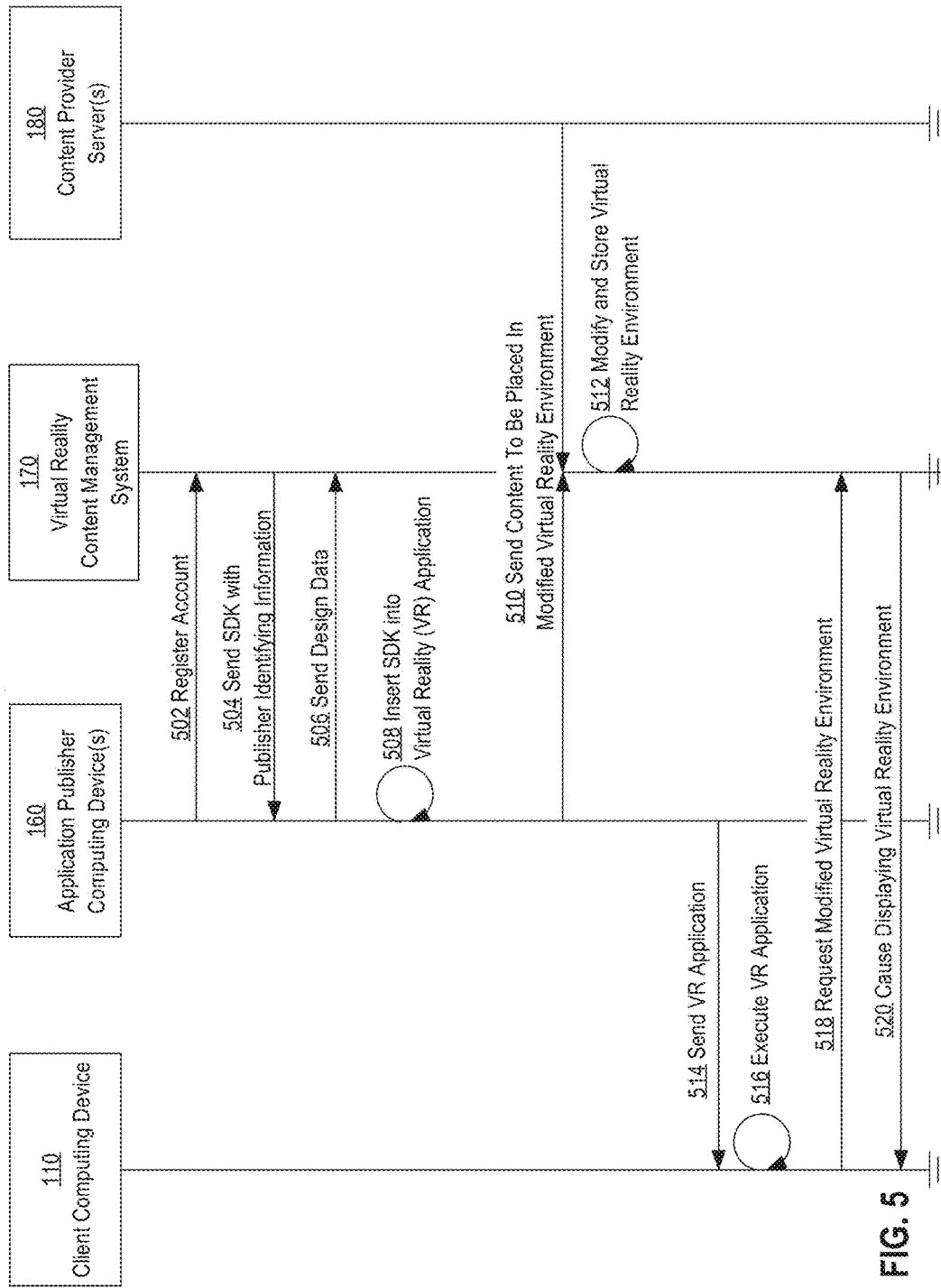
FIG. 5 illustrates a message diagram that depicts an example method for generating and displaying a modified virtual reality environment for displaying particular content in a particular application.

FIG. 5 illustrates a message diagram that depicts an example method for generating and displaying a modified virtual reality environment for displaying particular content in a particular application.

At step 502, application publisher computing device(s) 160 registers an account with virtual reality content management system. For example, an application publisher may generate a user account with virtual reality content management system 130 through an application or website provided by virtual reality content management system 130.

At step 504, virtual reality content management system 170 sends a software development kit with publisher identifying information, such as an application ID and placement ID, to application publisher computing device(s) 160. The software development kit may include tools for generating an environment within the particular application by making calls to virtual reality content management system 170 for design data and content. In an embodiment, the application ID and placement ID are generated and sent to application publisher computing device(s) 160 in response to a request for an application ID and placement ID. Additionally, virtual reality content management system 170 may store data identifying that the application ID and placement ID are currently in use.

At step 506, application publisher computing device(s) 160 sends design data to virtual reality content management system 170. For example, application publisher computing device(s) 160 may send a virtual reality scene and/or selection of one or more design elements to virtual reality content management system 170. Application publisher computing device(s) 160 may also identify design elements to be added at the time of execution based on one or more states of a related application. Application publisher computing device(s) 160 may additionally send the publisher identifying information with the design data in order to identify the particular application to be associated with the design data.

At step 508, application publisher computing device(s) 160 inserts a software development kit (SDK) into a virtual reality application. For example, application publisher computing device(s) 160 may insert, into a particular application, a virtual reality environment library generated by virtual reality content management system 170. The virtual reality environment library may be an SDK configured to render a virtual reality environment on demand by making one or more calls to virtual reality content management system 170. The one or more calls may use the publisher identifying information to identify the requested content and include a request for instructions on how to build the virtual reality environment through the SDK provided by virtual reality content management system 170, a request for particular content, a request for other configurable elements such as additional content, and/or one or more callbacks to indicate success or failure of the initialization and loading or to cause displaying the particular content in the particular virtual reality environment. In an embodiment, the virtual reality environment with particular content may be loaded in advance of being displayed. For example, the request to load the virtual reality environment may be placed at the initialization of the initial application, thereby allowing the client computing device to display the content in the particular virtual reality environment at any point during the execution of the application.

At step 510 either content provider server(s) 180 or application publisher computing device(s) 160 sends content to be placed in the modified virtual reality environment to virtual reality content management system 170. The content may be provided at any point prior to the display of the content on the client computing device. For example, application publisher computing device(s) 160 may send content directly to virtual reality content management system 170 along with the publisher identifying information so that the content is associated with the particular application. Additionally and/or alternatively, content provider server(s) 180 may send content to virtual reality content management system 170. Virtual reality content management system 170 may request from application publisher computing device(s) 160 authorization to display content received from content provider server(s) 180 and only display content in the modified virtual reality environment that is authorized by application publisher computing device(s) 160. The received content may include additional static content, executable content, and/or three dimensional content. Virtual reality content management system 170 may also receive applications to make available for download or instructions which, when executed by a client computing device, cause the client computing device to navigate to applications for download and/or purchase.

At step 512, virtual reality content management system 170 modifies and stores the virtual reality environment. For example, virtual reality content management system 170 may attach metadata to a virtual reality environment and save it in a format that allows it to be executed on a client computing device in response to one or more calls to application programming interfaces of virtual reality content management system 170. Additionally and/or alternatively, modifying the virtual reality environment may comprise attaching received content to the virtual reality environment. Attaching received content to the virtual reality environment may be performed on the fly, such as in response to a request from client computing device 110 for a modified virtual reality environment. This allows virtual reality content management system 170 to cycle through content received from potentially multiple content provider servers 180 each time a call is made to display a modified virtual reality environment.

At step 514, application publisher computing device(s) 160 sends the VR application to client computing device 110. Sending the VR application to client computing device 110 may comprise placing the application on a platform application store, such as a marketplace application, for download onto client computing device 110. The VR application may include instructions for making calls to virtual reality content management system 170 to display a virtual reality environment associated with a particular placement ID and application ID. The VR application may further include instructions for identifying a state of the application and sending state date to virtual reality content management system 170 with the request to display a virtual reality environment associated with the particular placement ID and application ID. In some embodiment, application publisher computing device(s) 160 also sends a modified virtual reality environment without the particular content to client computing device 110, thereby minimizing the amount of data to be loaded from virtual reality content management system when the content is displayed.

At step 516, client computing device 110 executes the VR application. For example, client computing device 110 may play a three dimensional movie or initiate a virtual reality video game.

At step 518, client computing device 110 requests a modified virtual reality environment from virtual reality content management system 170. For example, client computing device 110 may execute the instructions within the application which cause the client computing device to make one or more calls to APIs of virtual reality content management system 170 to initialize and load a virtual reality environment. The calls may include the publisher identifying information in order to identify the particular design data for the particular application. The request may occur in response to user stimulus, such as a selection of an option to display content, or in response to a particular application state, such as a transition in a movie or game. Additionally and/or alternatively, one or more calls may occur in advance of the display of the virtual reality environment for displaying content. For example, the calls to initialize the SDK of virtual reality content management system 170 and to being loading content into the virtual reality environment may occur at the start of execution of the application or in response to a completion of a prior content display event. The loaded environment may be then be called at the convenience of the executing application.

At step 520, virtual reality content management system 170 causes displaying the virtual reality environment on client computing device 110. Causing displaying of the virtual reality environment may include loading the modified virtual reality environment on the client computing device with the content displayed on a virtual screen. Displaying the virtual reality environment on client computing device 110 may further comprise displaying a transition between the application and the modified virtual reality environment, such as displaying a character's car driving off an exit of a racetrack to a drive-in theater or displaying a character opening a door, stepping into a movie theater, and walking to a particular seat.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-pur pose computing devices may be desktop computer systems, portable computer systems, handheld devices, networking devices or any other device that incorporates hard-wired and/or program logic to implement the techniques.

Figure 6:
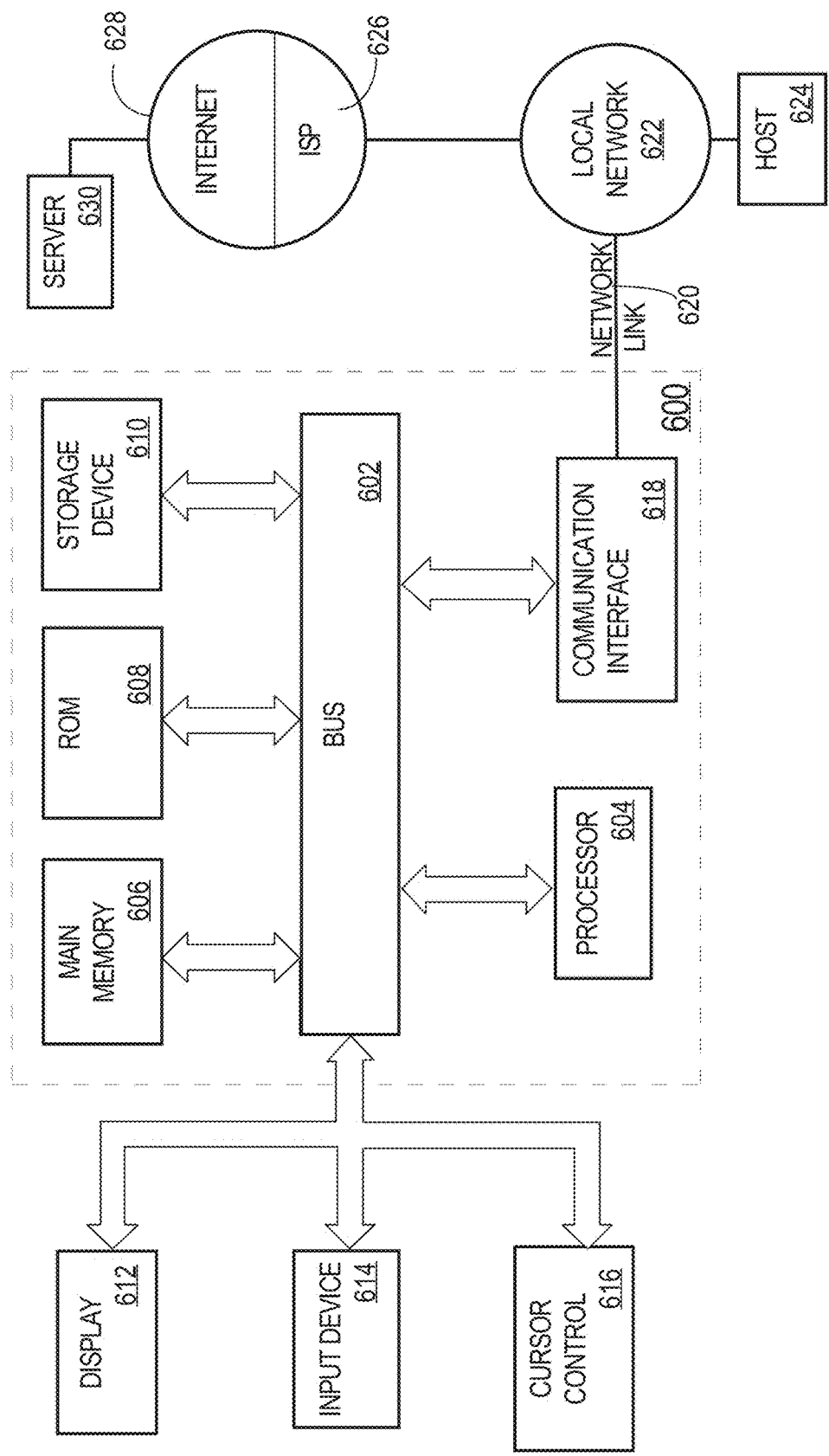
FIG. 6 is a block diagram that illustrates a computer system upon which an embodiment may be implemented.

For example, FIG. 6 is a block diagram that illustrates a computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6. Application Downloads

In an embodiment, virtual reality content management system 170 provides instructions for client computing device 110 to download additional content while executing a virtual reality application. For example, an SDK provided to application publisher computing device(s) 160 may include instructions which, when executed by a client computing device, cause the client computing device to perform a method of downloading applications through a marketplace application, such as a two dimensional marketplace application on a mobile computing device, from a virtual reality application executing on the client computing device. Additional content may comprise applications, such as advertised applications through the virtual reality environment for displaying content.

Figure 7:
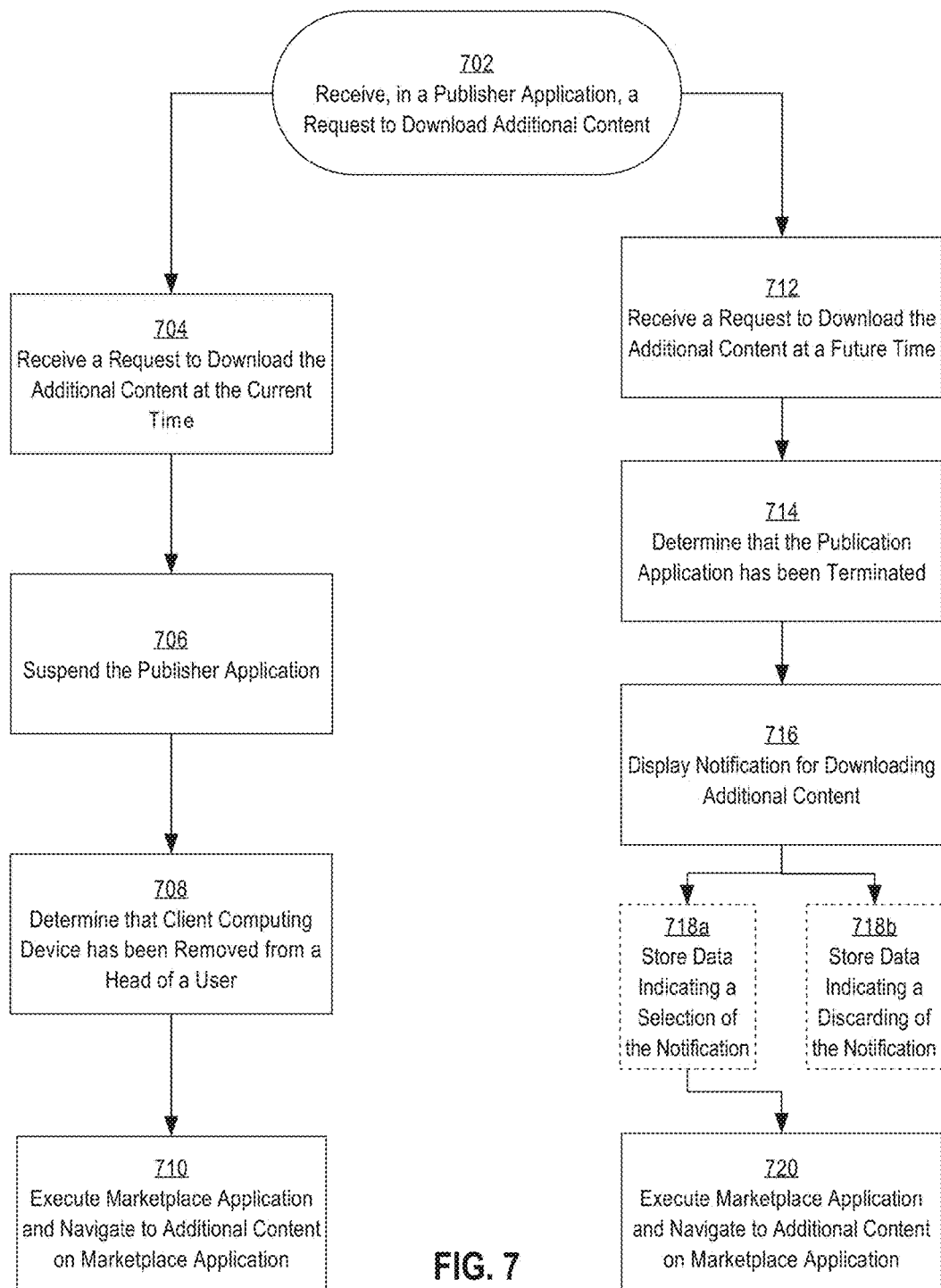
FIG. 7 depicts an example method for downloading applications onto a client computing device from a virtual reality application.

FIG. 7 depicts an example method for downloading applications onto a client computing device from a virtual reality application. For example, an SDK which is integrated or compiled into a virtual reality application may cause a client computing device executing the virtual reality application to perform the method of FIG. 7. The use of an SDK is not required, and functionally equivalent instructions may be coded directly by the publisher, imported from a library, or statically or dynamically linked.

At step 702, a request to download additional content is received in a publisher application. The request to download additional content may be received during execution on the client computing device of a virtual reality application. For example, client computing device 110 may display, in a virtual reality application executing on client computing device 110, an option to download an application in return for a reward in the executing virtual reality application. Additionally and/or alternatively, client computing device 110 may display an option to download an application associated with particular content displayed in the modified virtual reality environment. For example, client computing device 110 may display, on the virtual screen displaying the particular content, a "Download Now" option, a "Download Later" option, or both a "Download Now" and "Download Later" option. The download options may be selectable through a focus on the option. For example, as a user's head moves, the central focus of the screen shifts. If the central focus of the screen remains on the download option for longer than a specified period of time, such as five seconds, the application may determine that the download option has been selected.

At step 704, a request to download the additional content at the current time is received. For example, client computing device 110 may receive a selection of the "Download Now" option from the modified virtual reality environment. Additionally and/or alternatively, client computing device 110 may receive the request to download additional content from different sections of the virtual reality application, such as through an offer displayed within the virtual reality application. At step 706, in response to receiving the request to download the application, a publisher application is suspended. For example, client computing device 110 may save a current application state and cease one or more functions of the currently executing publisher application, such as rendering the graphical environment and/or executing application events.

At step 708, the client computing device determines that the client computing device has been removed from a head of the user. For example, a head mounted display may include a light sensor which detects whether an object is inside the head mounted display. When the light sensor detects an absence of an object inside the head mounted display, client computing device 110 may determine that the head mounted display has been removed from a head of the user. As another example, a client computing device may be communicatively coupled to a head mounted display. The client computing device may determine that the head mounted display has been removed when the client computing device is disconnected from the head mounted display. By determining whether the head mounted display has been removed, client computing device 110 may create a more seamless transition between the virtual reality application and a two dimensional application store. For example, client computing device 110 may continue to display a three dimensional environment while the head mounted display is on a head of the user and only switch to a two dimensional display when the head mounted display has been removed from a head of the user.

At step 710, in response to the determination of step 708, the client computing device executes a marketplace application and navigates to the additional content in the marketplace application. For example, the SDK may include instructions which cause the client computing device to open a marketplace application and navigate to a particular portion of the marketplace application corresponding to the additional content. Additionally and/or alternatively a request may be sent to a marketplace application to cause the client computing device to download the particular application. For example, the SDK may include instructions which cause the client computing device to make calls to a marketplace application with an identification of a particular application and instructions to download the application, in response to the prior determination that the client computing device was removed from the head of the user.

In an embodiment, at step 712, a request to download the additional content at a future time is received. For example, client computing device 110 may receive a selection of the "Download Later" option from the modified virtual reality environment. Additionally and/or alternatively, client computing device 110 may receive the request to download additional content from different sections of the virtual reality application, such as through an offer displayed within the virtual reality application. In response to receiving a request to download the application at a future time, the client computing device may store data indicating that the request to download the application at a future time has been received. For example, the client computing device may queue up a push notification to display on the client computing device once the application has been terminated.

At step 714, the client computing device determines that the publication application has been terminated. For example, the client computing device may determine that the application has been closed and/or that the computing device has been removed from a head of the user. Additionally and/or alternatively, the SDK inserted into the publisher application may comprise instructions which run in response to an application termination request. Thus, when the application receives a request to close the executing application, the client computing device may determine that the application is being terminated and execute the instructions from the SDK.

At step 716, in response to step 714, a notification is displayed on the client computing device. For example, client computing device 110 may, at the time of termination of the publisher application, execute instructions from the publisher application which determine whether a request to download content later was received during execution of the publisher application. If client computing device 110 determines that a request was received, client computing device 110 may generate a notification, such as a push notification on a mobile computing device, for the request and display the push notification after the publisher application has closed. In an embodiment, client computing device 110 generates a different push notification for each request to download additional content. For example, if during the execution of a game, a user requests to download three different applications, client computing device 110 may generate three different push notifications. Additionally and/or alternatively, client computing device 110 may receive the notification from virtual reality content management system 170. For example, client computing device 110 may send data to virtual reality content management system 170 indicating a selection of the "Download Later" option when "Download Later" is selected. In response, virtual reality content management system 170 may generate and send a notification to client computing device. In an embodiment, the client computing device is configured to only display notifications when the publisher application is closed. Alternatively, in an embodiment where the client computing device is configured to display notifications while the publisher application is executing, the client computing device may receive a request from virtual reality content management system 170 to delay publication of the notification until the publisher application has been closed.

At step 718, data is optionally stored indicating whether the notification has been selected or discarded. In an embodiment, when the notification is generated, the client computing device loads a special module from the publisher application onto the client computing device. The special module may be inserted into the publisher application along with the SDK. In an embodiment, the SDK forces the special module to be enabled in the publisher application so that virtual reality management system 170 receives data indicating whether the notification has been selected or dismissed. The special module may track actions that are taken with respect to the notification. For example, if the notification is dismissed, the special module may store data indicating that the notification was dismissed. If the notification is selected, the special module may store data indicating that the notification was selected. The special module may send the stored data to virtual reality content management system 170, application publisher computing device(s) 160 and/or content provider server(s) 180 in order to track downloads of additional content based on selections of the option to download additional content.

The special module may also make one or more calls to a marketplace application. The one or more calls may indicate the application to be downloaded. In an embodiment, the special module is not displayed on the client computing device to a user of the client computing device. For example, the client computing device may display only the notification for download. When the notification is selected, the client computing device may store the selection data through the special module and make the calls to the marketplace application. The client computing device may then display the marketplace application. By displaying only the marketplace application after the notification, the client computing device allows tracking of the downloads without requiring a user to view multiple displays between selecting the notification and downloading the application.

At step 720, the client computing device executes a marketplace application and navigates to the additional content in the marketplace application. For example, the SDK may include instructions which, when the notification is selected, cause the client computing device to open a marketplace application and navigate to a particular portion of the marketplace application corresponding to the additional content. Additionally and/or alternatively, the notification may include instructions that cause the client computing device to send a request to a marketplace application to cause the client computing device to download the particular application. For example, the SDK may include instructions which cause the client computing device to make calls to a marketplace application with an identification of a particular application and instructions to download the application, in response to the prior determination that the client computing device was removed from the head of the user. In some embodiments, the notification calls the special module which makes the one or more calls to the marketplace application to download the particular application. By having the notification configured to make calls to the special module instead of the application store, the method is able to track whether the notification is accepted even after the publisher application has been closed.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:
1. A client computing device comprising:
a memory;
a digital display;
one or more processors communicatively coupled to the memory and configured to:
execute a digital graphical virtual reality application on the client computing device;
while executing the digital graphical virtual reality application, receive a request to view content from a content provider server;
request, over a network from a virtual reality content management system, a virtual reality environment separate from the digital graphical virtual reality application for the purpose of displaying inserted content from the digital graphical virtual reality application;
receive, from the virtual reality content management system over one or more networks, a virtual reality environment comprising a content display location in which content can be displayed and particular content to display in the content display location;
display, via a digital display of the client computing device, the virtual reality environment;
display the particular content in the content display location of the virtual reality environment;
display, with the particular content, an option to download the additional content at a future time;
while displaying the virtual reality environment on the client computing device, receive a request to download additional content at a future time;
transition from displaying the virtual reality environment to displaying the digital graphical virtual reality application;
determine that the digital graphical virtual reality application has been terminated;
based on the determining, display a notification on the client computing device that identifies the additional content;

receive a selection of the notification through the client computing device;

in response to receiving a selection of the notification, execute a marketplace application on the client computing device and navigating to the additional content on the marketplace application.

2. The client computing device of claim 1, wherein the one or more processors are further configured to, in response to receiving the selection of the notification, send, to a virtual reality content management system, over one or more networks, data indicating a selection of the notification.

3. The client computing device of claim 1, wherein the virtual reality environment further comprises design data associated with the digital graphical virtual reality application.

4. The client computing device of claim 3 wherein the design data comprises one or more environment textures, three dimensional models, and surface material properties that are collectively sufficient to permit generating a fully rendered three dimensional virtual reality environment.

5. The client computing device of claim 1,
wherein the particular content is two dimensional content;
wherein the virtual reality environment is a virtual three dimensional environment comprising a fixed virtual viewer location for viewing the particular content and a virtual screen for displaying the particular content.

6. The client computing device of claim 1, wherein the one or more processors are further configured to display the virtual reality environment only after the digital graphical virtual reality application reaches a transition point.

7. The client computing device of claim 1, wherein the one or more processors are further configured to display the virtual reality environment only after the digital graphical virtual reality application reaches a change in levels of a game.

8. A client computing device comprising:
a memory;
a digital display;
one or more processors communicatively coupled to the memory and configured to:
execute a digital graphical virtual reality application on a client computing device;
while executing the digital graphical virtual reality application, receive a request to view content from a content provider server;
request, over a network from a virtual reality content management system, a virtual reality environment separate from the digital graphical virtual reality application for the purpose of displaying inserted content from the digital graphical virtual reality application;
receive, from the virtual reality content management system over one or more networks, a virtual reality environment comprising a content display location in which content can be displayed and particular content to display in the content display location;
display, via a digital display of the client computing device, the virtual reality environment;
display the particular content in the content display location of the virtual reality environment;
display, with the particular content, an option to download the additional content at a future time;
while displaying the virtual reality environment on the client computing device, receive a request to download additional content at a current time;
in response to receiving the request to download additional content at the current time, suspend the digital graphical virtual reality application;

determine that the client computing device has been removed from a head of a user;
in response to the determining, execute a marketplace application on the client computing device and navigating to the additional content on the marketplace application.

9. A computer-implemented method comprising:
executing a digital graphical virtual reality application on a client computing device;
while executing the digital graphical virtual reality application, receiving a request to view content from a content provider server;
requesting, over a network from a virtual reality content management system, a virtual reality environment separate from the digital graphical virtual reality application for the purpose of displaying inserted content from the digital graphical virtual reality application;
receiving, from the virtual reality content management system over one or more networks, a virtual reality environment comprising a content display location in which content can be displayed and particular content to display in the content display location;
displaying, via a digital display of the client computing device, the virtual reality environment;
displaying the particular content in the content display location of the virtual reality environment;
displaying, with the particular content, an option to download the additional content at a future time;
while displaying the virtual reality environment on the client computing device, receiving a request to download additional content at a future time;
transitioning from displaying the virtual reality environment to displaying the digital graphical virtual reality application;
determining that the digital graphical virtual reality application has been terminated;
based on the determining, displaying a notification on the client computing device that identifies the additional content;
receiving a selection of the notification through the client computing device;
in response to receiving a selection of the notification, executing a marketplace application on the client computing device and navigating to the additional content on the marketplace application.

10. The computer-implemented method of claim 9, further comprising, in response to receiving the selection of the notification, sending, to a virtual reality content management system, over one or more networks, data indicating a selection of the notification.

11. The computer-implemented method of claim 9, wherein the virtual reality environment further comprises design data associated with the digital graphical virtual reality application.

12. The computer-implemented method of claim 11 wherein the design data comprises one or more environment textures, three dimensional models, and surface material properties that are collectively sufficient to permit generating a fully rendered three dimensional virtual reality environment.

13. The computer-implemented method of claim 9,
wherein the particular content is two dimensional content;
wherein the virtual reality environment is a virtual three dimensional environment comprising a fixed virtual viewer location for viewing the particular content and a virtual screen for displaying the particular content.

14. The computer-implemented method of claim 9 further comprising displaying the virtual reality environment only after the digital graphical virtual reality application reaches a transition point.

15. The computer-implemented method of claim 9 further comprising displaying the virtual reality environment only after the digital graphical virtual reality application reaches a change in levels of a game.

16. A computer implemented method comprising:
- executing a digital graphical virtual reality application on a client computing device;
- while executing the digital graphical virtual reality application, receiving a request to view content from a content provider server;
- requesting, over a network from a virtual reality content management system, a virtual reality environment separate from the digital graphical virtual reality application for the purpose of displaying inserted content from the digital graphical virtual reality application;
- receiving, from the virtual reality content management system over one or more networks, a virtual reality environment comprising a content display location in which content can be displayed and particular content to display in the content display location;
- displaying, via a digital display of the client computing device, the virtual reality environment;
- displaying the particular content in the content display location of the virtual reality environment;
- displaying, with the particular content, an option to download the additional content at a future time;
- while displaying the virtual reality environment on the client computing device, receiving a request to download additional content at a current time;
- in response to receiving the request to download additional content at the current time, suspending the digital graphical virtual reality application;
- determining that the client computing device has been removed from a head of a user;
- in response to the determining, executing a marketplace application on the client computing device and navigating to the additional content on the marketplace application.

* * * * *